(12) United States Patent
Akiyama (10) Patent No.: US 10,372,027 B2
(45) Date of Patent: Aug. 6, 2019

(54) ILLUMINATOR AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/904,865

(22) Filed: Feb. 26, 2018

(65) Prior Publication Data

US 2018/0252993 A1 Sep. 6, 2018

(30) Foreign Application Priority Data

Mar. 6, 2017 (JP) .................................. 2017-042223

(51) Int. Cl.
*G03B 21/20* (2006.01)

(52) U.S. Cl.
CPC ......... *G03B 21/208* (2013.01); *G03B 21/204* (2013.01); *G03B 21/2013* (2013.01); *G03B 21/2073* (2013.01)

(58) Field of Classification Search
CPC ................ G03B 21/204; G03B 21/208; G03B 21/2013; G03B 21/2033; G03B 21/2053; G03B 21/2066; G03B 21/2073; F21V 13/06; F21V 13/08; F21V 13/14; H01L 33/50; H01L 33/60; H01L 33/502; H01L 33/505

See application file for complete search history.

(56) References Cited

U.S. PATENT DOCUMENTS

| | | | |
|---|---|---|---|
| 2016/0088273 A1* | 3/2016 | Fukui | G03B 21/204 353/31 |
| 2016/0103387 A1* | 4/2016 | Nishimori | G03B 21/16 353/38 |

FOREIGN PATENT DOCUMENTS

JP 2014-138148 A 7/2014

* cited by examiner

*Primary Examiner* — Sultan Chowdhury
(74) *Attorney, Agent, or Firm* — Oliff PLC (57) ABSTRACT

An illuminator includes first and second light emitting devices that emit first and second light beams, respectively, first and second lens arrays, a light ray combining element that combines at least parts of the first and second light beams having passed through the first and second lens arrays with each other to produce a combined light ray flux, a light collection lens, and a diffused light producing element on which the combined light ray flux having passed through the light collection lens is incident.

9 Claims, 6 Drawing Sheets

ILLUMINATOR AND PROJECTOR

BACKGROUND

1. Technical Field

The present invention relates to an illuminator and a projector.

2. Related Art

In recent years, as a light source of an illuminator used in a projector, a semiconductor laser, which provides high-luminance, high-intensity light, has received attention. For example, JP-A-2014-138148 discloses a semiconductor laser package including a plurality of semiconductor lasers that each output a laser beam and a plurality of collimator lenses provided in correspondence with the semiconductor lasers. The collimator lenses are each typically a short focal length lens for cost reduction purposes. The shorter the focal length, the shorter the distance between the semiconductor lasers and the collimator lenses, whereby the laser beam parallelized by each of the collimator lenses has a smaller light flux diameter.

In the case where a laser beam is used as illumination light, a multi-lens array is used in some cases to increase the uniformity of the illuminance distribution in an illuminated area. In a case where a multi-lens array is combined with a laser beam having a small light flux diameter, the multi-lens array needs to be so configured that the lenses thereof are arranged at small intervals to increase the uniformity of the illuminance distribution. It is, however, not easy to arrange the lenses of the multi-lens array at small intervals.

SUMMARY

An advantage of some aspects of the invention is to provide an illuminator that allows the uniformity of the illuminance distribution to be increased by using a multi-lens array. Another advantage of some aspects of the invention is to provide a projector including the illuminator.

According to a first aspect of the invention, an illuminator is provided. The illuminator includes a first light emitting device that emits a first light beam, a second light emitting device that emits a second light beam, a first lens array on which the first light beam is incident, a second lens array on which the second light beam is incident, a light ray combining element that combines the first light beam having passed through the first lens array with at least part of the second light beam having passed through the second lens array to produce a combined light ray flux, a light collection lens on which the combined light ray flux is incident, and a diffused light producing element on which the combined light ray flux having passed through the light collection lens is incident, wherein a cross section of the first light beam that is perpendicular to an optical axis of the first light beam has a major axis, a cross section of the second light beam that is perpendicular to an optical axis of the second light beam has a major axis, and the first light emitting device and the second light emitting device are so provided that a plane containing the major axis of the first light beam and the optical axis of the first light beam and so located as to face a front side of the first lens array intersects a plane containing the major axis of the second light beam and the optical axis of the second light beam and so located as to face a front side of the second lens array.

The illuminator according to the first aspect causes the illuminance distribution formed on the first lens array by the first light beam to differ from the illuminance distribution formed on the second lens array by the second light beam. Combining the two types of illumination distribution allows a highly uniform illumination distribution to be formed on the diffused light producing element, which is an illuminated area.

In the first aspect described above, it is preferable that an angle of rotation of the first light emitting device viewed in a direction parallel to the optical axis of the first light emitting device differs from an angle of rotation of the second light emitting device viewed in a direction parallel to the optical axis of the second light emitting device.

The configuration described above readily allows the illumination distribution formed on the first lens array to differ from the illumination distribution formed on the second lens array.

In the first aspect described above, it is preferable that the illuminator further includes a first light source unit including a plurality of light emitting devices including the first light emitting device and a second light source unit including a plurality of light emitting devices including the second light emitting device, and that an angle of rotation of the first light source unit viewed in a direction parallel to the optical axis of the first light emitting device differs from an angle of rotation of the second light source unit viewed in a direction parallel to the optical axis of the second light emitting device.

The configuration described above readily allows the illumination distribution formed on the first lens array to differ from the illumination distribution formed on the second lens array.

In the first aspect described above, it is preferable that when a plain containing a direction in which the first lens array and the second lens array are arranged and a direction of a principal ray of the combined light ray flux is defined as a reference plane, an angle between the major axis of the cross section of the first light beam and the reference plane is greater than an angle between the major axis of the cross section of the second light beam and the reference plane, and an optical path length of the first light beam between the first lens array and the light collection lens is smaller than an optical path length of the second light beam between the second lens array and the light collection lens.

The optical path length of the second light beam from the point where the second light beam exits out of the second lens array to the point where the second light beam enters the light collection system is greater than the optical path length of the first light beam from the point where the first light beam exits out of the first lens array to the point where the first light beam enters the light collection system. The light flux width of the second light beam is therefore greater than the light flux width of the first light beam when the first and second light beams enter the light collection system.

The greater the angle between the major axis of the cross section of the second light beam and the reference plane, the greater the light flux width of the second light beam incident on the light collection system. In this case, loss could occur when the second light beam is incident on the diffused light producing element.

Employing the configuration described above can suppress the spread of the light flux width of the second light beam, which travels over a longer optical path length, whereby the optical loss can be reduced.

In the first aspect described above, the diffused light producing element may include a phosphor.

According to the configuration described above, the phosphor can efficiently produce fluorescence.

According to a second aspect of the invention, a projector is provided. The projector includes the illuminator according to the first aspect described above, a light modulator that modulates light from the illuminator in accordance with image information to produce image light, and a projection system that projects the image light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments according to the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

Figure 1:
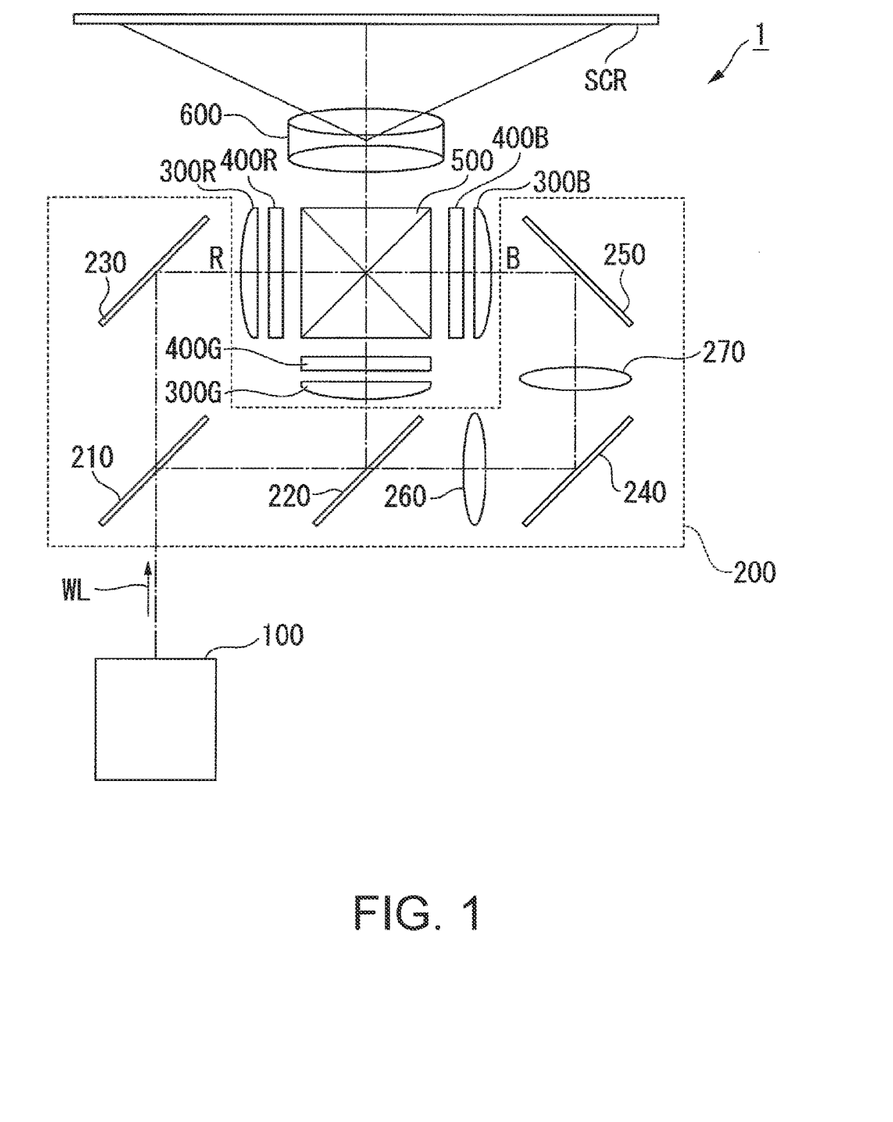
FIG. 1 shows a schematic configuration of a projector according to a first embodiment.

A projector according to the present embodiment will first be described. FIG. 1 shows a schematic configuration of a projector 1 according to the present embodiment.

The projector 1 includes an illuminator 100, a color separation/light guide system 200, light modulators 400R, 400G, and 400B, a cross dichroic prism 500, and a projection system 600, as shown in FIG. 1.

In the present embodiment, the illuminator 100 outputs white illumination light WL toward the color separation/light guide system 200.

The color separation/light guide system 200 includes dichroic mirrors 210 and 220, reflection mirrors 230, 240, and 250, and relay lenses 260 and 270. The color separation/light guide system 200 separates the light from the illuminator 100 into red light, green light, and blue light and guides them to the light modulators 400R, 400G, and 400B, which correspond to the red light, the green light, and the blue light, respectively.

Light collection lenses 300R, 300G, and 300B are disposed between the color separation/light guide system 200 and the light modulators 400R, 400G, and 400B.

The dichroic mirror 210 is a dichroic mirror that transmits a red light component and reflects green and blue light components.

The dichroic mirror 220 is a dichroic mirror that reflects the green light component and transmits the blue light component.

The light modulators 400R, 400G, and 400B each modulate the color light flux incident thereon in accordance with image information to form an image. Although not shown, light-incident-side polarizers are disposed between the light collection lenses 300R, 300G, and 300B and the light modulators 400R, 400G, and 400B, and light-exiting-side polarizers are disposed between the light modulators 400R, 400G, and 400B and the cross dichroic prism 500.

The cross dichroic prism 500 combines the image light fluxes outputted from the light modulators 400R, 400G, and 400B with one another to form a color image.

The cross dichroic prism 500 is formed by bonding four rectangular prisms to each other and therefore has a roughly square shape in a plan view, and dielectric multilayer films are formed along the roughly X-letter-shaped interfaces between the bonded rectangular prisms.

The color image having exited out of the cross dichroic prism 500 is enlarged and projected by the projection system 600 on a screen SCR.

Illuminator

Figure 2:
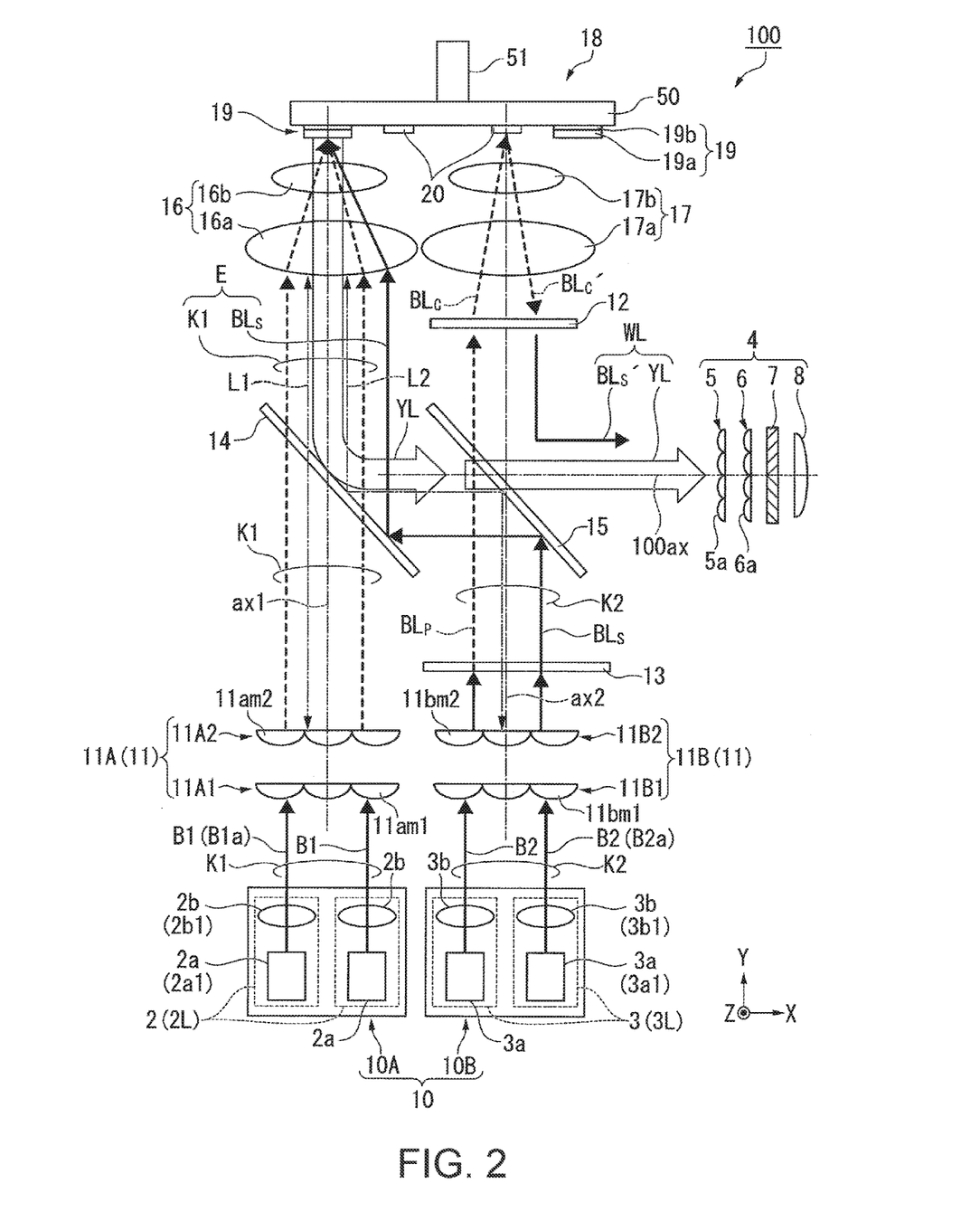
FIG. 2 shows a schematic configuration of an illuminator.

FIG. 2 shows a schematic configuration of the illuminator 100.

The illuminator 100 includes a homogenized illumination system 4, a light source unit 10, a homogenizer system 11, a first retardation film 12, a second retardation film 13, a first polarization separation element 14, a second polarization separation element 15, a first light collection system 16, a second light collection system 17, and a rotating wheel 18, as shown in FIG. 2. The homogenizer system 11 includes a first lens array 11A and a second lens array 11B.

The homogenized illumination system 4 includes a multi-lens array 5, a multi-lens array 6, a polarization conversion element 7, and a superimposing lens 8. The multi-lens array 5 includes a plurality of lenses 5a, and the multi-lens array 6 includes a plurality of lenses 6a.

The polarization conversion element 7 aligns the polarization directions of the light rays that form the illumination light WL with one another. The polarization conversion element 7 is formed, for example, of polarization separation films, retardation films, and mirrors.

In the present embodiment, the superimposing lens 8 collects sub-light fluxes from the polarization conversion element 7 and superimposes them on one another in the vicinity of an image formation area of each of the light modulators 400R, 400G, and 400B. The multi-lens array 5, the multi-lens array 6, and the superimposing lens 8 form an optical integration system that homogenizes the in-plane optical intensity distribution of the illumination light WL.

In the present embodiment, the light source unit 10 includes a first light source unit 10A, which outputs a first light ray flux K1, and a second light source unit 10B, which outputs a second light ray flux K2.

The rotating wheel 18 includes a phosphor element 19 and a diffusive reflection element 20.

Reference character ax1 represents the optical axis of the first light source unit 10A, and reference character ax2 represents the optical axis of the second light source unit 10B. The optical axis ax1 coincides with the principal ray of the first light flue K1, and the optical axis ax2 coincides with the principal ray of the second light flue K2.

The following description will be made by using an XYZ coordinate system in some cases. In FIG. 2, the direction X is the direction parallel to an illumination optical axis $100ax$ of the illuminator 100, the direction Y is the direction parallel to the optical axes ax1 and ax2, and the direction Z is the direction perpendicular to the directions X and Y.

In the present embodiment, the first light source unit 10A, the first lens array 11A, the first polarization separation element 14, the first light collection system 16, and the phosphor element 19 are sequentially arranged along the optical axis ax1.

The second light source unit 10B, the second lens array 11B, the second retardation film 13, the second polarization separation element 15, the first retardation film 12, the second light collection system 17, and the diffusive reflection element 20 are sequentially arranged along the optical axis ax2. The first polarization separation element 14, the second polarization separation element 15, and the homogenized illumination system 4 are sequentially arranged along the illumination optical axis 100ax. The optical axes ax1 and ax2 and the illumination optical axis 100ax are in the same plane, and the optical axes ax1 and ax2 are perpendicular to the illumination optical axis 100ax.

The first light source unit 10A includes a plurality of light sources 2. The light sources 2 each include a light emitting device 2a and a collimator lens 2b. That is, the first light source unit 10A includes a plurality of light emitting devices 2a and a plurality of collimator lenses 2b. The plurality of light emitting devices 2a include a first light emitting device 2a1. The plurality of collimator lenses 2b include a first collimator lens 2b1, which parallelizes a light ray B1a emitted from the first light emitting device 2a1.

The light emitting devices 2a are each formed of a semiconductor laser device that is a semiconductor laser accommodated, for example, in a metal package and emit a light ray B1 formed of a blue light beam (intensity of emitted light peaks at about 445 nm).

Figure 3:
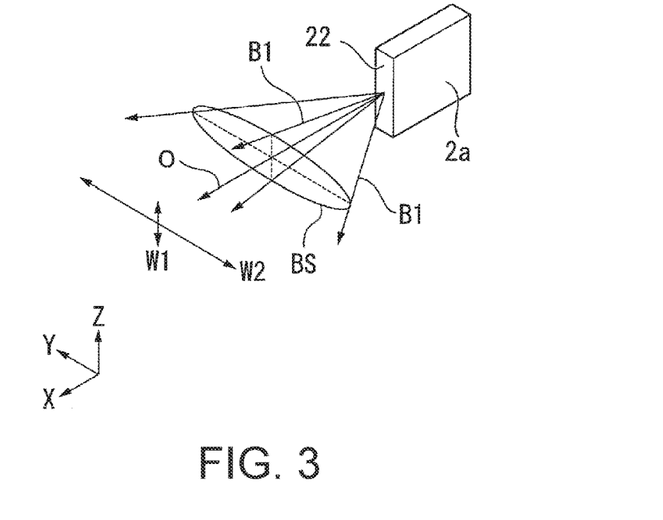
FIG. 3 shows a key part configuration of a light emitting device.

FIG. 3 shows a key part configuration of each of the light emitting devices 2a.

The light emitting devices 2a each have a light exiting surface 22, through which the light ray B1 exits, as shown in FIG. 3. The light exiting surface 22 has a roughly rectangular plan shape having a lengthwise direction W1 and a widthwise direction W2 when viewed in the direction of the principal ray O of the light ray B1.

The amount of spread of the light ray B1 in the widthwise direction W2 is greater than the amount of spread of the light ray B1 in the lengthwise direction W1. The light ray B1 therefore has an elliptical cross-sectional shape BS having a minor axis that coincides with the lengthwise direction W1 and a major axis that coincides with the widthwise direction W2.

Referring back to FIG. 2, the collimator lenses 2b are provided in correspondence with the light emitting devices 2a and convert the light rays B1 emitted from the light emitting devices 2a into parallelized light rays. In the present embodiment, the collimator lenses 2b are each a short focal length lens for cost reduction of the light sources 2.

The thus configured first light source unit 10A outputs the first light ray flux K1 formed of a plurality of parallelized light rays B1. In the present embodiment, the light ray B1a emitted from the first light emitting device 2a1 corresponds to the "first light beam" in the appended claims.

In the first light source unit 10A, the plurality of light sources 2 are arranged in a matrix when viewed in the direction parallel to the optical axis ax1. Specifically, the plurality of light sources 2 form a plurality of light source rows 2L arranged in the direction X, and the light source rows 2L are each formed of a plurality of light sources 2 arranged in the direction Z. In the present embodiment, the number of light source rows 2L is two, and the light source rows 2L each include two light sources 2 (see FIG. 4).

The second light source unit 10B include a plurality of light sources 3. The light sources 3 each include a light emitting device 3a and a collimator lens 3b. That is, the second light source unit 10B includes a plurality of light emitting devices 3a and a plurality of collimator lenses 3b. The plurality of light emitting devices 3a include a second light emitting device 3a1. The plurality of collimator lenses 3b include a second collimator lens 3b1, which parallelizes a light ray B2a emitted from the second light emitting device 3a1.

The light emitting devices 3a are each formed of a semiconductor laser device accommodated in a metal package and emit a light ray B2 formed of a blue light beam (intensity of emitted light peaks at about 445 nm), as in the case of the light emitting devices 2a.

The light emitting devices 3a each have a light exiting surface 22, which has roughly rectangular plan shape and through which the light ray B2 exits (see FIG. 3), as in the case of the light emitting devices 2a.

The collimator lenses 3b are provided in correspondence with the light emitting devices 3a and convert the light rays B2 emitted from the light emitting devices 3a into parallelized light rays. In the present embodiment, the collimator lenses 3b are each a short focal length lens for cost reduction of the light sources 3.

The thus configured second light source unit 10B outputs the second light ray flux K2 formed of a plurality of parallelized light rays B2. In the present embodiment, the light ray B2a emitted from the second light emitting device 3a1 corresponds to the "second light beam" in the appended claims.

In the second light source unit 10B, the plurality of light sources 3 are arranged in a matrix when viewed in the direction parallel to the optical axis ax2. Specifically, the plurality of light sources 3 form a plurality of light source rows 3L arranged in the direction X, and the light source rows 3L are each formed of a plurality of light sources 3 arranged in the direction Z. In the present embodiment, the number of light source rows 3L is two, and the light source rows 3L each include two light sources 3 (see FIG. 4).

The arrangement of the light source unit 10 and the homogenizer system 11 will be described later.

In the present embodiment, the first light ray flux K1 and the second light ray flux K2 are formed of light that belongs to the same wavelength band. The first light ray flux K1 and the second light ray flux K2 have the same amount of light.

The first light ray flux K1 is incident on the first lens array 11A of the homogenizer system 11, and the second light ray flux K2 is incident on the second lens array 11B of the homogenizer system 11. The first lens array 11A and the second lens array 11B have the same configuration (shape, size, and interval between lenses).

The first lens array 11A includes a front lens array 11A1 and a rear lens array 11A2. The front lens array 11A1 includes a plurality of lenses 11am1, and the rear lens array 11A2 includes a plurality of lenses 11am2 corresponding to the lenses 11am1.

The second lens array 11B includes a front lens array 11B1 and a rear lens array 11B2. The front lens array 11B1 includes a plurality of lenses 11bm1, and the rear lens array 11B2 includes a plurality of lenses 11bm2 corresponding to the lenses 11bm1.

The first lens array 11A and the second lens array 11B may be integrated with each other or separate from each other. That is, the front lens arrays 11A1 and 11B1 may be integrated with each other or separate from each other. Similarly, the rear lens arrays 11A2 and 11B2 may be integrated with each other or separate from each other.

The first lens array 11A cooperates with the first light collection system 16 to homogenize the illuminance distribution of the first light ray flux K1 on the phosphor element 19. The second lens array 11B cooperates with the first light collection system 16 to homogenize the illuminance distribution of part of the second light ray flux K2 on the phosphor element 19. The second lens array 11B further cooperates with the second light collection system 17 to homogenize the illuminance distribution of the remainder of the second light ray flux K2 on the diffusive reflection element 20.

The first light ray flux K1 having passed through the homogenizer system 11 is incident on the first polarization separation element 14. The first polarization separation element 14 has a polarization separation function of separating light polarized in a specific direction from blue light and a color separation function of reflecting fluorescence YL irrespective of the polarization state of the fluorescence YL.

In the present embodiment, the light rays B1, which form the first light ray flux K1, are each incident as P-polarized light on the first polarization separation element 14. The first light ray flux K1 therefore passes through the first polarization separation element 14 and travels toward the phosphor element 19.

The first polarization separation element 14 combines light rays BLs reflected off the second polarization separation element 15 with the first light ray flux K1 to produce combined light (excitation light E). The first polarization separation element 14 therefore functions as a light ray combining element. In the present embodiment, the excitation light E corresponds to the "combined light ray flux" in the appended claims.

The first light collection system 16 collects the excitation light E and directs the collected excitation light E toward the phosphor element 19 on the rotating wheel 18. In the present embodiment, the phosphor element 19 is disposed in the focus position of the first light collection system 16. The first light collection system 16 is formed, for example, of pickup lenses 16a and 16b. In the present embodiment, the first light collection system 16 corresponds to the "light collection lens" in the appended claims, and the phosphor element 19 corresponds to the "diffused light producing element" in the appended claims.

In the present embodiment, the rotating wheel 18 includes a circular plate 50, a motor 51, which drives and rotates the circular plate 50, and the phosphor element 19 and the diffusive reflection element 20, which each have a ring shape and are coaxially provided on the circular plate 50. The phosphor element 19 is disposed in a region outside the diffusive reflection element 20.

The circular plate 50 is formed, for example, of a metal member that excels in heat dissipation. The phosphor element 19 includes a phosphor layer 19a and a reflector 19b provided between the circular plate 50 and the phosphor layer 19a.

The thus configured phosphor element 19 outputs the fluorescence YL produced in the phosphor layer 19a toward the first light collection system 16.

The phosphor layer 19a contains phosphor particles that absorb the excitation light E, convert the excitation light E into the fluorescence YL, which is yellow fluorescence, and emit it. The phosphor particles can, for example, be a YAG-based (yttrium-aluminum-garnet-based) phosphor.

In the present embodiment, the motor 51 rotates the circular plate 50 to change the position where the excitation light E is incident on the phosphor layer 19a.

The fluorescence YL emitted from the phosphor layer 19a travels via the first light collection system 16 and the first polarization separation element 14 and impinges on the second polarization separation element 15.

On the other hand, the second light ray flux K2 having passed through the homogenizer system 11 is incident on the second retardation film 13.

The second retardation film 13 is, for example, a half-wave plate rotatable around the Y axis. Changing the angle of rotation of the second retardation film 13 changes the direction of the optic axis of the second retardation film 13.

In the present embodiment, the light rays B2, which form the second light ray flux K2, are each linearly polarized light. The second light ray flux K2 having passed through the second retardation film 13 is therefore light containing an S-polarized light component (hereinafter referred to as light rays BLs) with respect to the second polarization separation element 15 and a P-polarized light component (hereinafter referred to as light rays BLp) with respect to the second polarization separation element 15 with the S-polarized and P-polarized components contained at a predetermined ratio. Appropriately setting the angle of rotation of the second retardation film 13 therefore allows the ratio between the S-polarized light component and the P-polarized light component contained in the second light ray flux K2 to be changed.

The second polarization separation element 15 is formed of a polarization separation element having wavelength selectivity. Specifically, the second polarization separation element 15 has a polarization separation function of separating light polarized in a specific direction from light (blue light) that belongs to the wavelength band to which the second light ray flux K2 belongs and a color separation function of transmitting the fluorescence YL, which belongs to a wavelength band different from the wavelength band to which the second light ray flux K2 belongs, irrespective of the polarization state of the fluorescence YL.

The light rays BLs are reflected off the second polarization separation element 15 and directed toward the phosphor element 19. That is, the light rays BLs are used to excite the phosphor layer 19a. In the present embodiment, the light rays BLs correspond to the "at least part of the second light beam" in the appended claims.

The light rays BLs are sequentially reflected off the second polarization separation element 15 and the first polarization separation element 14, and the light rays BLs, along with the first light ray flux K1 having passed through the first polarization separation element 14, produces the excitation light E. The excitation light E is incident on the phosphor element 19 via the first light collection system 16, as described above.

The light rays BLp pass through the second polarization separation element 15 and the first retardation film 12 and then enter as light rays BLc the second light collection system 17.

The first retardation film 12 is formed of a quarter-wave plate disposed in the optical path between the second polarization separation element 15 and the diffusive reflection element 20. The light rays BLp, when passing through the first retardation film 12, are converted into circularly polarized light rays BLc. The light rays BLc having passed through the first retardation film 12 are incident on the second light collection system 17.

The second light collection system 17 collects the light rays BLc and directs the collected light rays BLc toward the diffusive reflection element 20. The second light collection system 17 is formed, for example, of pickup lenses 17a and 17b. In the present embodiment, the diffusive reflection element 20 is disposed in the focus position of the second light collection system 17.

The diffusive reflection element 20 diffuses and reflects the light rays BLc having exited out of the second light collection system 17 toward the second polarization separation element 15. The light reflected off the diffusive reflection element 20 is referred to as light rays BLc'. The diffusive reflection element 20 preferably reflects the light rays BLc incident thereon in the form of Lambertian reflection.

The diffusive reflection element 20 is, for example, a diffusive reflection plate formed of a light reflective member on which irregularities are formed. The circularly polarized light rays BLc' having been reflected off the diffusive reflection element 20 and having passed through the second light collection system 17 again pass through the first retardation film 12, which converts the circularly polarized light rays BLc' into S-polarized light rays BLs'. The S-polarized light rays BLs' (blue light) are reflected off the second polarization separation element 15. The second polarization separation element 15 combines the fluorescence YL having passed through the second polarization separation element 15 with the light rays BLs' into the white illumination light WL. The white illumination light WL enters the homogenized illumination system 4.

In the present embodiment, the white illumination light WL is produced, for example, by causing 20% of the overall amount of light outputted from the light source unit 10 to be incident on the diffusive reflection element 20 and 80% of the light to be incident on the phosphor element 19. The second light ray flux K2 corresponds to 50% of the overall amount of light outputted from the light source unit 10. In view of the fact described above, the angle of rotation of the second retardation film 13 is so set that the ratio between the light rays BLs and the light rays BLp in the second light ray flux K2 having passed through the second retardation film 13 is 6:4.

Since the ratio between the light rays BLs' and the fluorescence YL depends on the ratio between the light rays BLs and the light rays BLp, adjusting the angle of rotation of the second retardation film 13 allows adjustment of the color temperature of the illumination light WL.

To produce bright fluorescence YL, the uniformity of the illuminance distribution of the excitation light on the phosphor layer 19a needs to be increased.

The light sources 2 and 3 in the present embodiment employ the short-focal-length collimator lenses 2b and 3b for cost reduction, as described above. The shorter the focal length, the smaller the light flux diameter of each of the parallelized light rays B1 and B2. Therefore, the shorter the focal length, the smaller the spot diameter formed on the homogenizer system 11 by each of the light rays B1 and B2.

In contrast, for example, it is conceivable that the homogenizer system 11 employs multi-lens arrays each having a small interval between the lenses to divide each of the small spots into smaller spots.

Employing multi-lens arrays each having a small interval between the lenses, however, causes a problem of a large increase in cost. In contrast, the present embodiment, in which the homogenizer system 11 can employ multi-lens arrays each having a relatively large interval between the lenses, causes no problem of a large increase in cost.

Figure 4:
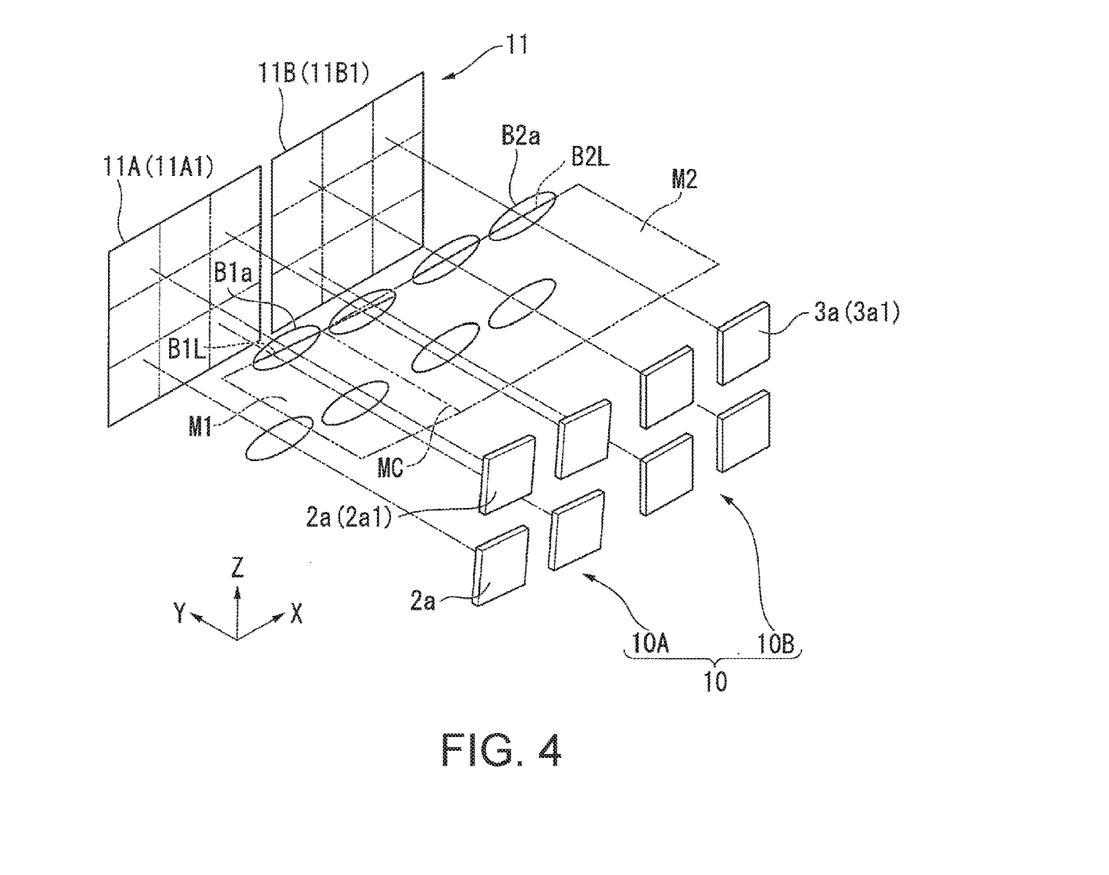
FIG. 4 is a perspective view showing the positional relationship between a homogenizer system and a light source unit.

FIG. 4 is a perspective view showing the positional relationship between the homogenizer system 11 and the light source unit 10 in the present embodiment. FIG. 4 shows only the front lens arrays 11A1 and 11B1, which are located on the light incident side, as the homogenizer system 11. Further, FIG. 4 shows only the light emitting devices 2a and 3a in the light source unit 10.

The light rays B1 and B2 emitted from the light emitting devices in the light source unit 10 each have major axes BL1 and B2L, respectively, in the cross-sectional shapes in an XZ plane perpendicular to the direction of the optical axes of the light rays B1 and B2 (direction Y). That is, the light rays B1 and B2 each have a roughly elliptical cross-sectional shape, as shown in FIG. 3.

Let plane M1 be a plane containing the major axis B1L of the light ray B1a and the optical axis of the light ray B1a and so located as to face the front side of the first lens array 11A, and let plane M2 be a plane containing the major axis B2L of the light ray B2a and the optical axis of the light ray B2a and so located as to face the front side of the second lens array 11B. In the present embodiment, the first light emitting device 2a1 and the second light emitting device 3a1 are so provided that the planes M1 and M2 intersect each other. In FIG. 4, reference character MC represents the line of intersection where the planes M1 and M2 intersect each other.

Figure 5:
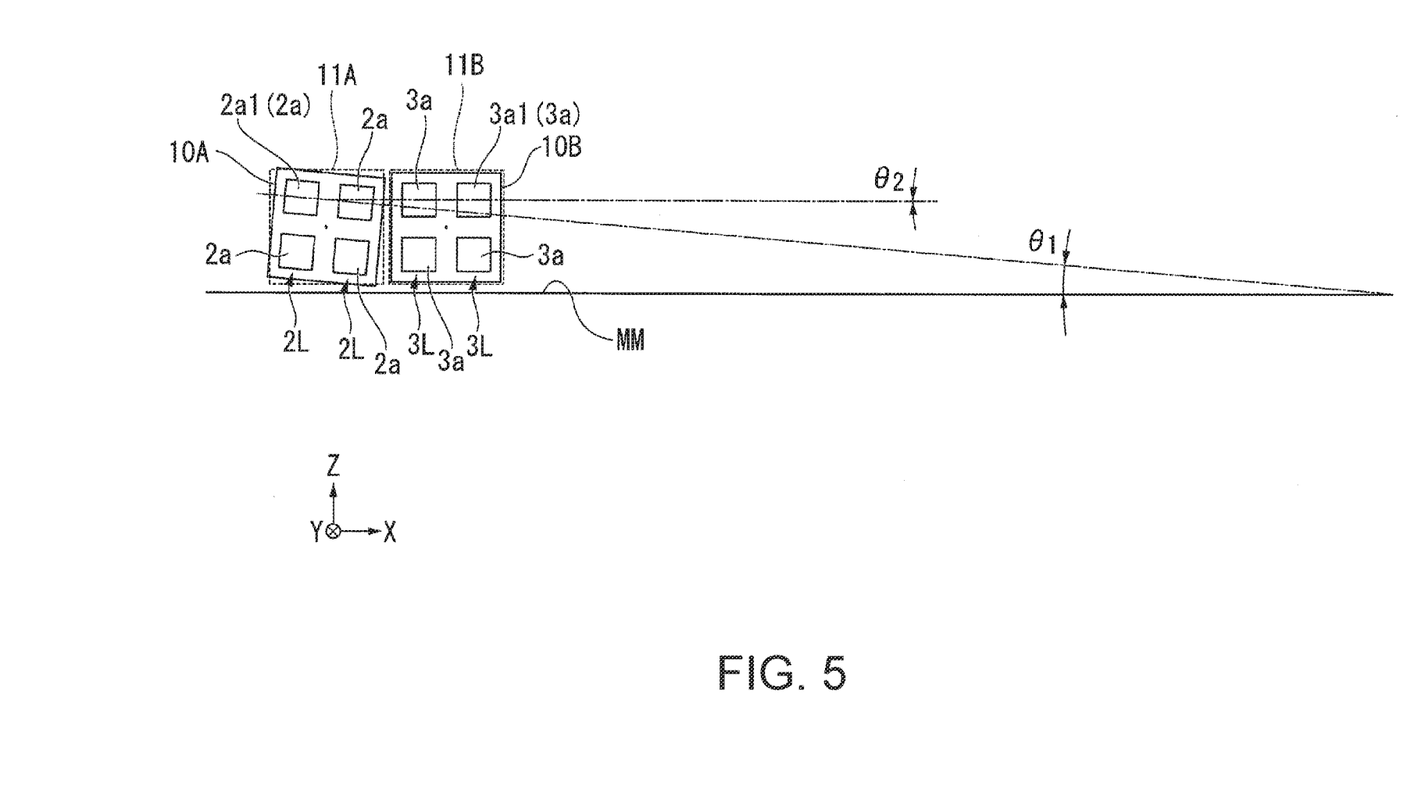
FIG. 5 is a plan view showing the positional relationship between the homogenizer system and the light source unit.

FIG. 5 is a plan view showing the positional relationship between the homogenizer system 11 and the light source unit 10 in the present embodiment. Let a reference plane MM be a plane containing the direction in which the first lens array 11A and the second lens array 11B are arranged (direction X) and the direction of the principal ray of the excitation light E (direction Y). The angle between the plane M1 and the reference plane MM is defined as an angle of rotation $\theta_1$ of the first light emitted device 2a1 viewed in the direction parallel to the optical axis ax1. The angle between the plane M2 and the reference plane MM is defined as an angle of rotation $\theta_2$ of the second light emitted device 3a1 viewed in the direction parallel to the optical axis ax2. The angle of rotation $\theta_1$ and the angle of rotation $\theta_2$ differ from each other, as shown in FIG. 5. In the present embodiment, the angle of rotation $\theta_1$ is set to be greater than the angle of rotation $\theta_2$. For example, the angle of rotation $\theta_1$ is set at 5 degrees, and the angle of rotation $\theta_2$ is set at 0 degrees.

The optical path length L1 of the light ray B1a between the first light emitting device 2a1 and the phosphor element 19 is smaller than the optical path length L2 of the light ray B2a between the second light emitting device 3a1 and the phosphor element 19 (see FIG. 2).

The relationship between the angles of rotation $\theta_1$ and $\theta_2$ and the relationship between the optical path lengths L1 and L2 are also satisfied between the other light emitting devices 2a provided in the first light source unit 10A and the other light emitting devices 3a provided in the second light source unit 10B.

That is, the angles of rotation of the plurality of light emitting devices 2a when the light emitting devices 2a are viewed in the direction parallel to the optical axis ax1 are each $\theta_1$, and the angles of rotation of the plurality of light emitting devices 3a when the light emitting devices 3a are viewed in the direction parallel to the optical axis ax2 are each $\theta_2$.

Assume now that the angle between the direction in which the light source rows 2L in the first light source unit 10A are arranged and the reference plane MM described above is the angle of rotation of the first light source unit 10A, and that the angle between the direction in which the light source rows 3L in the second light source unit 10B are arranged and the reference plane MM described above is the angle of rotation of the second light source unit 10B.

The angle of rotation of the first light source unit 10A is $\theta_1$, and the angle of rotation of the second light source unit 10B is $\theta_2$. The angle of rotation $\theta_1$ of the first light source unit 10A (5°) is therefore greater than the angle of rotation $\theta_2$ of the second light source unit 10B (0°).

As described above, in the present embodiment, the first light source unit 10A is so disposed as to be rotated relative to the first lens array 11A, and the second light source unit 10B is so disposed as not to be rotated relative to the second lens array 11B, as shown in FIG. 5.

The illuminator 100 according to the present embodiment, in which the angle of rotation $\theta_1$ of the first light source unit 10A differs from the angle of rotation $\theta_2$ of the second light source unit 10B as described above, allows improvement in the uniformity of the illuminance distribution of the excitation light E on the phosphor layer 19a without employing a small-interval homogenizer system 11. Effects provided by the configuration of the present embodiment will be described below.

Figure 6:
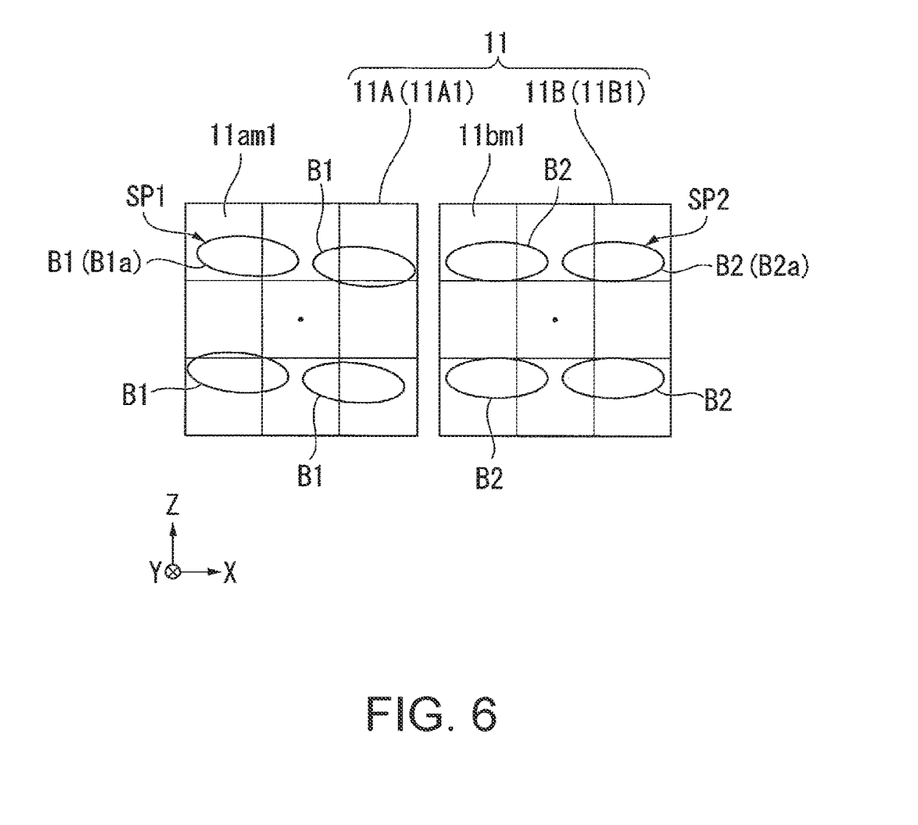
FIG. 6 shows positions where light rays are incident on the homogenizer system.

FIG. 6 shows spots formed on the homogenizer system 11 by the light rays B1 and B2. FIG. 6 shows only the front lens arrays 11A1 and 11B1 (plurality of lenses 11am1 and 11bm1) as the homogenizer system 11.

The plurality of light rays B1 outputted from the first light source unit 10A form a plurality of spots SP1 on the front lens array 11A1, as shown in FIG. 6. The angle of rotation of the spots SP1 is $\theta_1$. The plurality of light rays B2 outputted from the second light source unit 10B form a plurality of spots SP2 on the front lens array 11B1. The spots SP2 are formed as non-rotated spots.

In the present embodiment, the positional relationship between the positions where the light rays B1 are incident on the front lens array 11A1 and the lenses 11am1 differs from the positional relationship between the positions where the light rays B2 are incident on the front lens array 11B1 and the lenses 11bm1. That is, the illuminance distribution formed on the front lens array 11A1 by the first light ray flux K1 differs from the illuminance distribution formed on the front lens array 11B1 by the second light ray flux K2. The illuminance distribution on each of the lenses 11am1 and the illuminance distribution on each of the lenses 11bm1 are superimposed on one another on the phosphor element 19, which is the illuminated area.

As Comparative Example, a description will be made of a case where the angle of rotation $\theta_1$ of the first light source unit 10A is equal to the angle of rotation $\theta_2$ of the second light source unit 10B or a case where neither of the units is rotated (angles of rotation $\theta_1$ and $\theta_2$ are 0 degrees).

In the case where the angles of rotation $\theta_1$ and $\theta_2$ are the same or each 0 degrees, the illuminance distribution formed on the front lens array 11A1 by the first light ray flux K1 is the same as the illuminance distribution formed on the front lens array 11B1 by the second light ray flux K2. The number of types of illumination distributions superimposed on the phosphor element 19 is half the number in the present embodiment.

According to the present embodiment, the number of types of illumination distributions superimposed on the phosphor element 19 is greater, whereby the uniformity of the illumination distribution of the excitation light E on the phosphor element 19 is better than in Comparative Example.

The optical path length L2 of the light rays B2 from the point where the light rays B2 exit out of the second lens array 11B to the point where the light rays B2 enter the first light collection system 16 is greater than the optical path length L1 of the light rays B1 from the point where the light rays B1 exit out of the first lens array 11A to the point where the light rays B1 enter the first light collection system 16. The light flux width of the light rays B2 is therefore greater than the light flux width of the light rays B1 when the light rays B1 and B2 enter the first light collection system 16.

For example, in a case where the second light source unit 10B is rotated in place of the first light source unit 10A, the light flux width of the light rays B2 spreads by an excessive amount when the light rays B2 enter the first light collection system 16, undesirably resulting in a possible loss of the light incident on the phosphor layer 19a and inefficient generation of the fluorescence YL.

In contrast, the present embodiment employs the configuration in which the first light source unit 10A, which outputs the light rays B1, which travel over the shorter optical path length L1, is rotated, but the second light source unit 10B, which outputs the light rays B2, which travel over the longer optical path length L2, is not rotated. The configuration suppresses the spread of the light flux width of the light rays B2, which travel over the longer optical path length, whereby the optical loss can be reduced.

The illuminator 100 according to the present embodiment allows the phosphor layer 19a of the phosphor element 19 to be illuminated with the excitation light E having a highly uniform illumination distribution, whereby bright fluorescence YL can be produced as the illumination light WL.

Further, the front lens arrays 11A1 and 11B1 do not each need to be a lens array formed of lenses at small intervals, whereby the increase in cost of the illuminator 100 can be suppressed.

The projector 1 according to the present embodiment, which includes the illuminator 100 described above, can display a bright image with the increase in the cost of the projector 1 suppressed.

Second Embodiment

An illuminator according to a second embodiment will be subsequently described. In the following description, configurations and members common to those in the first embodiment have the same reference characters, and detailed descriptions of the common configurations and members will be omitted or simplified.

Figure 7:
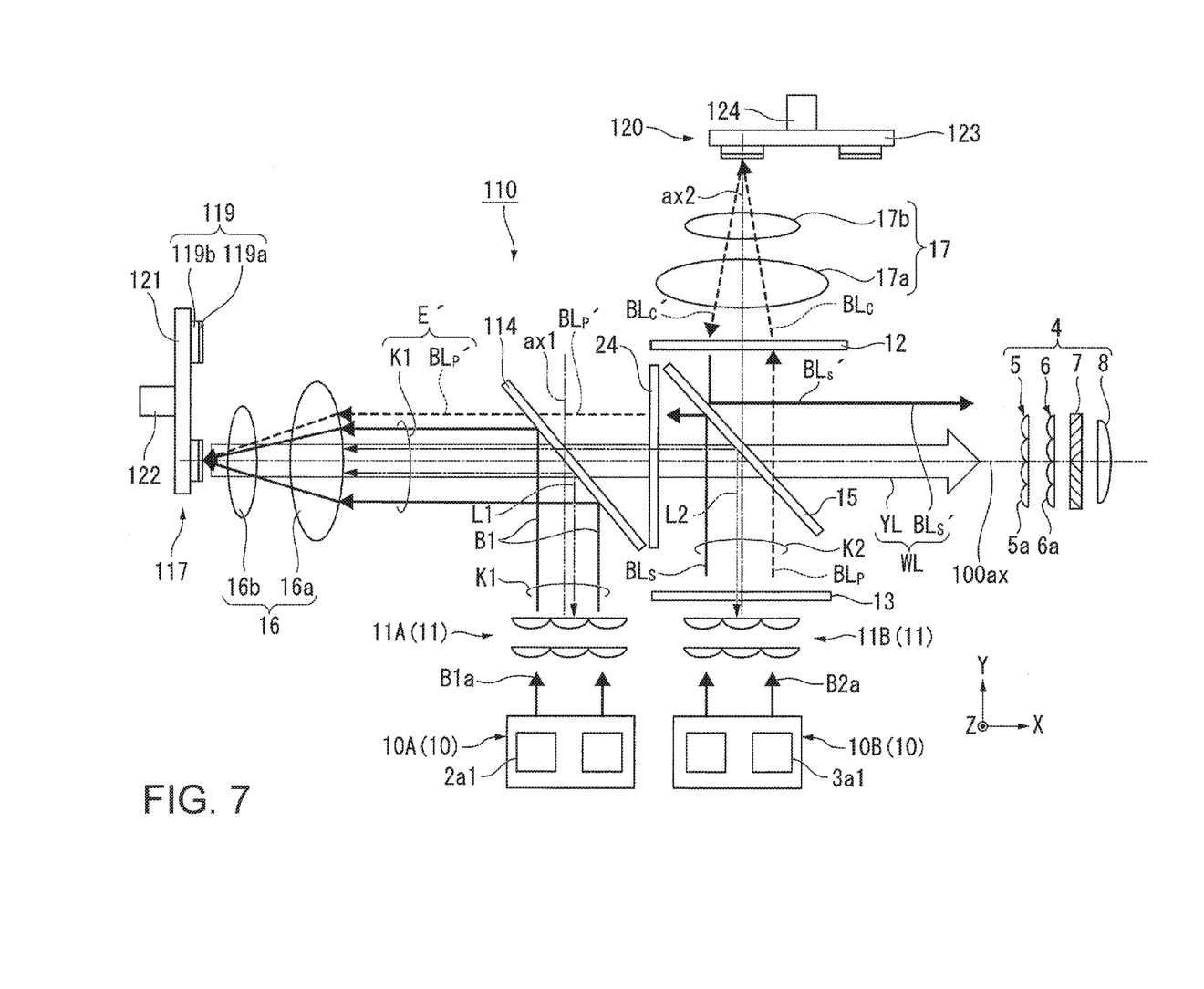
FIG. 7 shows a schematic configuration of an illuminator according to a second embodiment.

FIG. 7 shows a schematic configuration of an illuminator 110 according to the present embodiment.

The illuminator 110 includes the homogenized illumination system 4, the light source unit 10, the homogenizer system 11, the first retardation film 12, the second retardation film 13, a third retardation film 24, a first polarization separation element 114, the second polarization separation element 15, the first light collection system 16, the second light collection system 17, a phosphor wheel 117, and a diffusive reflection element 120, as shown in FIG. 7.

In the present embodiment, the first light source unit 10A, the homogenizer system 11, and the first polarization separation element 114 are sequentially arranged along the optical axis ax1.

The second light source unit 10B, the homogenizer system 11, the second retardation film 13, the second polarization separation element 15, the first retardation film 12, the second light collection system 17, and the diffusive reflection element 120 are sequentially arranged along the optical axis ax2. The phosphor wheel 117, the first light collection system 16, the first polarization separation element 114, the third retardation film 24, and the second polarization separation element 15 are sequentially arranged along the illumination optical axis ax100.

Also in the present embodiment, the optical path length L1 of the light ray B1a between the homogenizer system 11 and the first light collection system 16 is smaller than the optical path length L2 of the light ray B2a between the homogenizer system 11 and the first light collection system 16.

The first light ray flux K1 having passed through the homogenizer system 11 is incident on the first polarization separation element 114. The first polarization separation element 114 is formed of a polarization separation element having wavelength selectivity. Specifically, the first polarization separation element 114 has a polarization separation function of separating light polarized in a specific direction from light (blue light) that belongs to the wavelength band to which the first light ray flux K1 belongs and a color separation function of transmitting the fluorescence YL, which belongs to a wavelength band different from the wavelength band to which the first light ray flux K1 belongs, irrespective of the polarization state of the fluorescence YL.

In the present embodiment, the light rays BL, which form the first light ray flux K1, are each incident as S-polarized light on the first polarization separation element 114. The first light ray flux K1 is therefore reflected off the first polarization separation element 114 and travels toward a phosphor element 119. The first polarization separation element 114 transmits light rays BLp', which are light rays having been reflected off the second polarization separation element 15 and then having passed through the third retardation film 24 as the P-polarized light component, as will be described later. The light rays BLp' having passed through the first polarization separation element 114 are combined with the first light ray flux K1 reflected off the first polarization separation element 114 into excitation light E'.

The first light collection system 16 collects the excitation light E' and directs the collected excitation light E' toward the phosphor element 119 on the phosphor wheel 117. In the present embodiment, the phosphor element 119 on the phosphor wheel 117 is disposed in the focus position of the first light collection system 16.

In the present embodiment, the phosphor wheel 117 includes a circular plate 121, a motor 122, which drives and rotates the circular plate 121, and the phosphor element 119, which has a ring shape and is provided on the circular plate 121. The phosphor element 119 includes a phosphor layer 119a and a reflector 119b. The circular plate 121 is formed, for example, of a metal member that excels in heat dissipation.

The thus configured phosphor element 119 outputs the fluorescence YL produced in the phosphor layer 119a toward the first light collection system 16.

The fluorescence YL emitted from the phosphor layer 119a passes through the first light collection system 16, the first polarization separation element 114, the third retardation film 24, and the second polarization separation element 15 in this order.

The light rays BLs of the second light ray flux K2, which are each formed of the S-polarized light component with respect to the second polarization separation element 15, are reflected off the second polarization separation element 15, pass through the first polarization separation element 114, and produce, along with the first light ray flux K1, the excitation light E', as in the first embodiment. The light rays BLp of the second light ray flux K2, which are each formed of the P-polarized light component, pass through the second polarization separation element 15 and the first retardation film 12 and are therefore incident as the light rays BLc on the second light collection system 17.

The light rays BLc are collected by the second light collection system 17 and directed toward the diffusive reflection element 120. The diffusive reflection element 120 includes a circular plate 123 and a motor 124, which drives and rotates the circular plate 123.

The circularly polarized light rays BLc' having been reflected off the diffusive reflection element 120 and having again passed through the second light collection system 17 pass through the first retardation film 12 again, which converts the circularly polarized light rays BLc' into the S-polarized light rays BLs'. The S-polarized light rays BLs' (blue light) are reflected off the second polarization separation element 15 and combined with the fluorescence YL having passed through the second polarization separation element 15 into the white illumination light WL.

Also in the present embodiment, the angle of rotation $\theta_1$ of the first light source unit 10A is set at 5 degrees, and the angle of rotation $\theta_2$ of the second light source unit 10B is set at 0 degrees, whereby the illumination distribution formed on the front lens array 11A1 by the first light ray flux K1 differs from the illumination distribution formed on the front lens array 11B1 by the second light ray flux K2. The uniformity of the illuminance distribution on the phosphor layer 119a can thus be increased. Bright fluorescence YL can therefore be produced as the illumination light WL.

The invention is not limited to the contents of the embodiments described above and can be changed as appropriate to the extent that the change does not depart from the substance of the invention.

For example, in the embodiments described above, the configuration in which the circular plates that support the phosphor layers 19a and 119a are rotated has been presented as an example of the configuration of the phosphor elements 19 and 119. Instead, the phosphor elements 19 and 119 may each be a fixed phosphor element having a configuration in which the circular plate is not rotated.

In the embodiments described above, the angle of rotation $\theta_2$ of the second light source unit 10B is set at 0 degrees, but the angle of rotation $\theta_2$ may instead be an angle other than 0 degrees.

The angle of rotations $\theta_1$ and $\theta_2$ can be set as appropriate at a value that falls within a range, for example, from 0 to 90 degrees. The angle of rotation $\theta_2$ of the second light source unit 10B is preferably smaller than the angle of rotation $\theta_1$ of the first light source unit 10A from the viewpoint of the optical loss described above.

The embodiments described above have been described with reference to the case where the entire first light source unit 10A is rotated, but not necessarily in the invention. For example, only part of the plurality of light emitting devices 2a (first light emitting devices 2a1, for example), which form the first light source unit 10A, may be rotated by the angle of rotation $\theta_1$. Still instead, in the case where the second light source unit 10B is rotated as described above, instead of rotating the entire unit, for example, only part of the plurality of light emitting devices 3a (second light emitting device 3a1, for example), which form the second light source unit 10B, may be rotated.

The light source unit 10 may be formed of one unit. In this case, out of the plurality of light emitting devices, the light emitting devices that emit light beams to be incident on the first lens array 11A may be rotated by the angle of rotation $\theta_1$, and the light emitting devices that emit light beams to be incident on the second lens array 11B may not be rotated.

The embodiments described above have been described with reference to the case where a phosphor element is used as the diffused light producing element on which the combined light ray flux is incident, but the combined light ray flux may instead be incident on the diffusive reflection element.

The embodiments described above have been described with reference to the case where part of the second light ray flux K2 (S-polarized light component) is combined with the first light ray flux K1 to produce the combined light ray flux, but the entire second light ray flux K2 may be combined with the first light ray flux K1 to produce the combined light ray flux.

The embodiments described above have been described with reference to the case where the direction of the light outputted from the first light source unit 10A is the same as the direction of the light outputted from the second light source unit 10B, but not necessarily in the invention. For example, the invention is also applicable to a configuration in which the first light source unit 10A outputs the light in the direction perpendicular to the direction of the light outputted from the second light source unit 10B.

Further, in the embodiments described above, the projector 1 including the three light modulators 400R, 400G, and 400B has been presented by way of example. The invention is also applicable to a projector that displays color video images by using a single light modulator. Further, a digital mirror device may be used as each of the light modulators.

Further, in the above description, the illuminator according to any of the embodiments of the invention is used in a projector, but not necessarily. The illuminator according to any of the embodiments of the invention can be used also in a lighting apparatus, an automobile headlight, and other apparatuses.

The entire disclosure of Japanese Patent Application No. 2017-042223, filed on Mar. 6, 2017 is expressly incorporated by reference herein.

What is claimed is:

1. An illuminator comprising:
a first light emitting device that emits a first light beam;
a second light emitting device that emits a second light beam;
a first lens array on which the first light beam is incident;
a second lens array on which the second light beam is incident;
a light ray combining element that combines the first light beam having passed through the first lens array with at least part of the second light beam having passed through the second lens array to produce a combined light ray flux;
a light collection lens on which the combined light ray flux is incident; and
a diffused light producing element on which the combined light ray flux having passed through the light collection lens is incident,
wherein a cross section of the first light beam that is perpendicular to an optical axis of the first light beam has a major axis,
a cross section of the second light beam that is perpendicular to an optical axis of the second light beam has a major axis, and
the first light emitting device and the second light emitting device are so provided that a plane containing the major axis of the first light beam and the optical axis of the first light beam and so located as to face a front side of the first lens array intersects a plane containing the major axis of the second light beam and the optical axis of the second light beam and so located as to face a front side of the second lens array.

2. The illuminator according to claim 1,
wherein an angle of rotation of the first light emitting device viewed in a direction parallel to the optical axis of the first light emitting device differs from an angle of rotation of the second light emitting device viewed in a direction parallel to the optical axis of the second light emitting device.

3. The illuminator according to claim 1, further comprising;
a first light source unit including a plurality of light emitting devices including the first light emitting device; and
a second light source unit including a plurality of light emitting devices including the second light emitting device,
wherein an angle of rotation of the first light source unit viewed in a direction parallel to the optical axis of the first light emitting device differs from an angle of rotation of the second light source unit viewed in a direction parallel to the optical axis of the second light emitting device.

4. The illuminator according to claim 1,
wherein when a plain containing a direction in which the first lens array and the second lens array are arranged and a direction of a principal ray of the combined light ray flux is defined as a reference plane, an angle between the major axis of the cross section of the first light beam and the reference plane is greater than an angle between the major axis of the cross section of the second light beam and the reference plane, and
an optical path length of the first light beam between the first lens array and the light collection lens is smaller than an optical path length of the second light beam between the second lens array and the light collection lens.

5. The illuminator according to claim 1,
wherein the diffused light producing element includes a phosphor.

6. A projector comprising:
the illuminator according to claim 1;
a light modulator that modulates light from the illuminator in accordance with image information to produce image light; and
a projection system that projects the image light.

7. A projector comprising:
the illuminator according to claim 2;
a light modulator that modulates light from the illuminator in accordance with image information to produce image light; and
a projection system that projects the image light.

8. A projector comprising:
the illuminator according to claim 3;
a light modulator that modulates light from the illuminator in accordance with image information to produce image light; and
a projection system that projects the image light.

9. A projector comprising:
the illuminator according to claim 4;
a light modulator that modulates light from the illuminator in accordance with image information to produce image light; and
a projection system that projects the image light.

* * * * *